A. HIRTH.
DOUBLE THRUST BALL BEARING.
APPLICATION FILED OCT. 13, 1906.
930,600.
Patented Aug. 10, 1909.
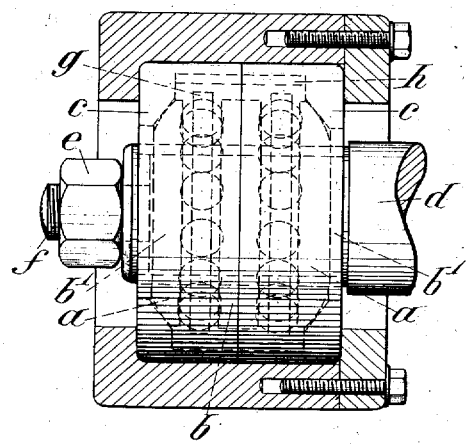
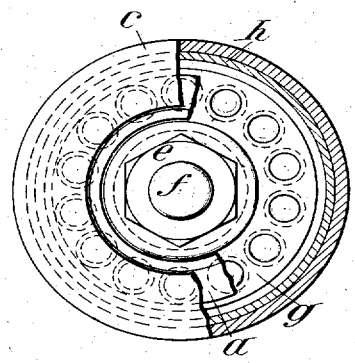
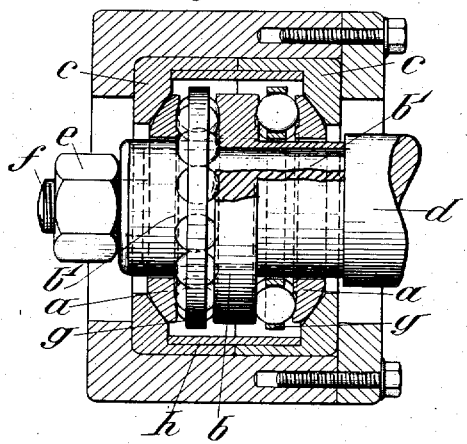
Inventor
Albert Hirth

UNITED STATES PATENT OFFICE.

ALBERT HIRTH, OF CANNSTATT, GERMANY, ASSIGNOR TO ERNST GUSTAV HOFFMANN, OF NEW ROCHELLE, NEW YORK; ALFRED W. KIDDLER AND AMALIE MATHILDE BAUMANN, EXECUTORS OF SAID ERNST GUSTAV HOFFMANN, DECEASED.

DOUBLE-THRUST BALL-BEARING.

No. 930,600.     Specification of Letters Patent.     Patented Aug. 10, 1909.

Application filed October 13, 1906. Serial No. 338,834.

*To all whom it may concern:*

Be it known that I, ALBERT HIRTH, a citizen of the German Empire, residing at Cannstatt, in the Kingdom of Würtemberg, Empire of Germany, have invented certain new and useful Improvements in Double-Thrust Ball-Bearings, of which the following is a description, reference being had to the accompanying drawing, and to the letters and figures of reference marked thereon.

The invention relates to a double thrust ball bearing, or one adapted to take up axial pressure in opposite directions or alternating thrusts, such as are met with in worm shafts.

According to the invention, the bearing proper is inclosed in a cylindrical housing suitably formed, or made in halves or parts, and comprises two rings of a well known type forming cages, in which the balls are loosely retained, and which cages are arranged on both sides of a collar fastened to the rotating shaft, said collar having grooves on both sides to form tracks for the balls. The supports for the balls on the other side consist of similarly grooved disks, the outer surfaces of which are approximately segments of a sphere so that they may adjust themselves automatically on suitable or correspondingly shaped seats inside the casing and distribute the thrust uniformly among the whole of the balls. This type of disk, forming a part of a ball bearing with a curved abutment seat is already well known. When the casing is formed in parts some means, such as an interior lining or sleeve, are employed to connect same.

By reason of the fact that the ball bearing is inclosed in a casing having an external cylindrical or equivalent surface, the whole part is easily handled, and it can be employed in most positions and places where bearings are required and be readily and securely held in place.

In the accompanying drawing is illustrated a form of bearing constructed according to the invention.

In such drawing:—Figure 1 is a side view of a double thrust ball bearing, according to this invention, showing the block holding the bearing in section; Fig. 2 is an end view of Fig. 1, partly in section, and—Fig. 3 is a similar view to Fig. 1 but in section.

The ball races consist of race rings $a$ $a$ having their outer surfaces formed each approximately as a segment of a sphere and of the collar $b$ which is carried by a sleeve $b^1$ fixed on the shaft $d$ in some suitable way, as for example by the aid of a nut $e$ and a washer, the former being screwed on to the threaded end $f$ of the shaft $d$ which is stepped at that part. The balls are held loosely in cages $g$ between the race rings and the collar respectively. The separate parts of the ball bearing are held together by the parts or cups $c$, which meet in a plane transverse or substantially transverse to the axis and form the housing or casing which parts or cups or one of them have a cylindrical exterior surface, while the inner surface of the said parts or cups is beveled or curved to form abutments and receive the curved surface of the race rings $a$. The means for securing the collar $b$ to the shaft, as will be observed, are accessible externally of the casing so that the complete bearing can be applied to or removed from the shaft without separating or adjusting the parts. The two parts of the housing in this case are held together by a tightly fitting internal sleeve $h$ which engages equally both halves, so that the casing and the parts of the bearing when assembled are securely held together.

I am aware that it has heretofore been proposed to make a double thrust bearing with an exterior cylindrical surface to the casing and a spherical seated end abutment, and in another case two such abutments, one of which was removable to insert the parts, and also to make a bearing having a cylindrical surface with removable end abutments separate therefrom, such abutments forming themselves the ball races.

Having now particularly described and ascertained the nature of my said invention and in what manner the same is to be performed, I declare that what I claim is:—

1. A ball bearing comprising two sets of balls, a collar interposed between the two sets of balls, race rings having ball races, a casing formed in two parts meeting in a plane transverse to the axis and each having an end wall which forms an abutment for the corresponding race ring, and means accessible externally of the casing for securing the collar to the shaft.

2. A ball bearing comprising two sets of balls, a collar interposed between the two sets of balls, race rings having ball races, a casing formed in two parts meeting in a plane transverse to the axis and each having an end wall which forms an abutment for the corresponding race ring, and means accessible externally of the casing for securing the collar to the shaft, each race ring having a spherical seat in the corresponding end of the casing.

3. A ball bearing comprising two sets of balls, a collar interposed between the two sets of balls, race rings having ball races, a casing formed in two parts meeting in a plane transverse to the axis and each having an end wall which forms an abutment for the corresponding race ring, an internal sleeve uniting said parts of the casing, and means accessible externally of the casing for securing the collar to the shaft.

In testimony whereof I affix my signature, in presence of two witnesses.

ALBERT HIRTH.

Witnesses:
WALTER SCHWAEBSCH,
RAOUL MATHEY-TORET.

---

It is hereby certified that in Letters Patent No. 930,600, granted August 10, 1909, upon the application of Albert Hirth, of Cannstatt, Germany, for an improvement in "Double-Thrust Ball-Bearings," the name of the first-mentioned executor of the assignee was erroneously written and printed "Alfred W. Kiddler," whereas it should have been written and printed *Alfred W. Kiddle;* and that the said Letters Patent should be read with this correction therein that the same may conform to the record of the case in the Patent Office.

Signed and sealed this 17th day of May, A. D., 1910.

[SEAL.]

C. C. BILLINGS,
*Acting Commissioner of Patents.* casing formed in two parts meeting in a plane transverse to the axis and each having an end wall which forms an abutment for the corresponding race ring, and means accessible externally of the casing for securing the collar to the shaft, each race ring having a spherical seat in the corresponding end of the casing.

3. A ball bearing comprising two sets of balls, a collar interposed between the two sets of balls, race rings having ball races, a casing formed in two parts meeting in a plane transverse to the axis and each having an end wall which forms an abutment for the corresponding race ring, an internal sleeve uniting said parts of the casing, and means accessible externally of the casing for securing the collar to the shaft.

In testimony whereof I affix my signature, in presence of two witnesses.

ALBERT HIRTH.

Witnesses:
WALTER SCHWAEBSCH,
RAOUL MATHEY-TORET.

---

Correction in Letters Patent No. 930,600.

It is hereby certified that in Letters Patent No. 930,600, granted August 10, 1909, upon the application of Albert Hirth, of Cannstatt, Germany, for an improvement in "Double-Thrust Ball-Bearings," the name of the first-mentioned executor of the assignee was erroneously written and printed "Alfred W. Kiddler," whereas it should have been written and printed *Alfred W. Kiddle;* and that the said Letters Patent should be read with this correction therein that the same may conform to the record of the case in the Patent Office.

Signed and sealed this 17th day of May, A. D., 1910.

[SEAL.]

C. C. BILLINGS,
*Acting Commissioner of Patents.*

It is hereby certified that in Letters Patent No. 930,600, granted August 10, 1909, upon the application of Albert Hirth, of Cannstatt, Germany, for an improvement in "Double-Thrust Ball-Bearings," the name of the first-mentioned executor of the assignee was erroneously written and printed "Alfred W. Kiddler," whereas it should have been written and printed *Alfred W. Kiddle;* and that the said Letters Patent should be read with this correction therein that the same may conform to the record of the case in the Patent Office.

Signed and sealed this 17th day of May, A. D., 1910.

[SEAL.]

C. C. BILLINGS,
*Acting Commissioner of Patents.*